United States Patent Office 3,090,928
Patented May 21, 1963

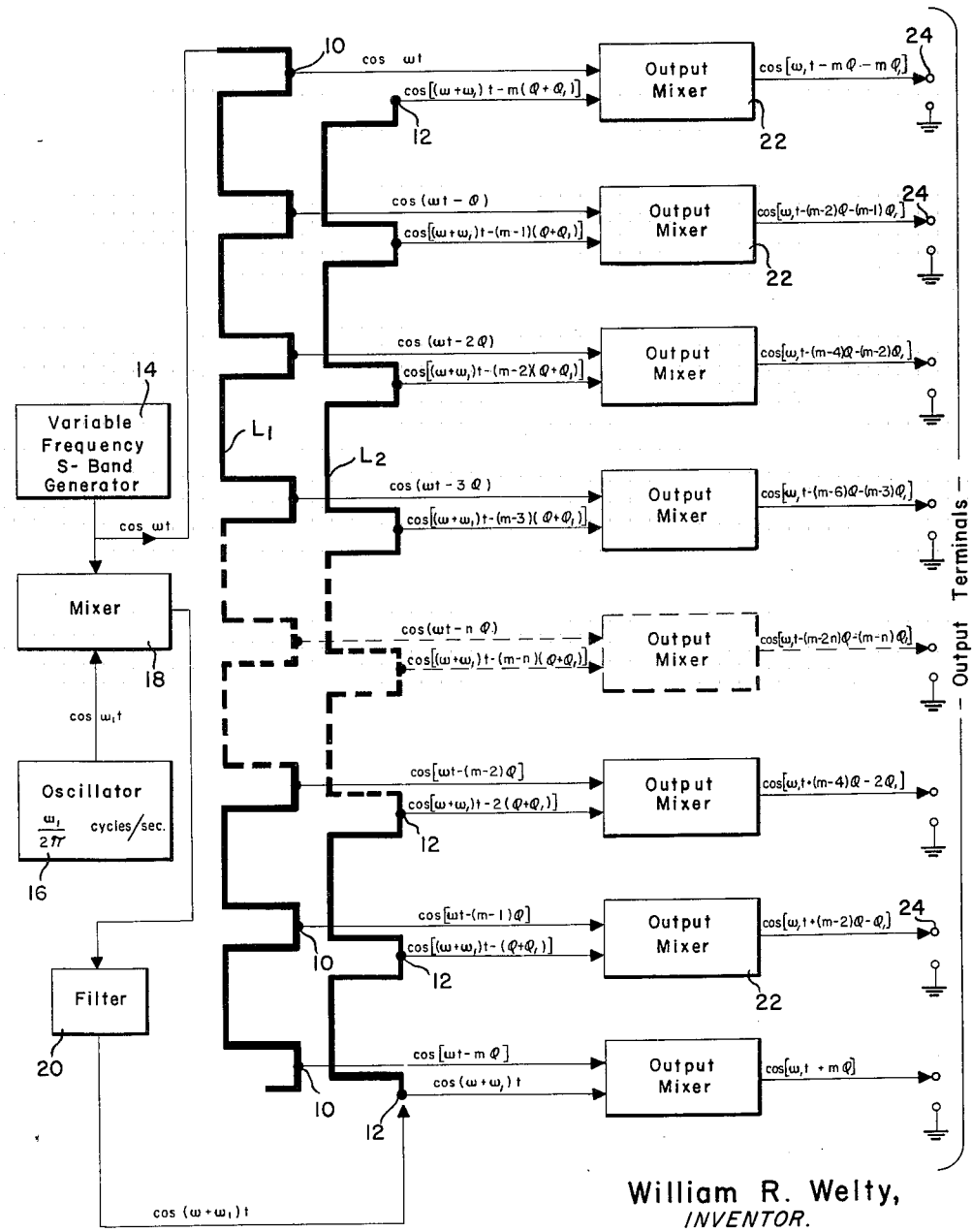

3,090,928
APPARATUS FOR GENERATING PLURALITY OF SIGNALS HAVING VARIABLE PHASE DIFFERENCE
William R. Welty, Fullerton, Calif., assignor to Hughes Aircraft Company, Culver City, Calif., a corporation of Delaware
Filed Jan. 2, 1958, Ser. No. 706,857
7 Claims. (Cl. 331—38)

The present invention relates to signal generating apparatus and more particularly to an apparatus for generating a plurality of signals of the same frequency, successive ones of which have uniform phase differences which may be controlled electronically without affecting the frequency.

The apparatus of the present invention is particularly adapted for use in conjunction with an electronic scanning radar system wherein the phase difference between successive signals determines the direction of a synthesized pencil beam. An electronic scanning radar system of this type is described and claimed in a copending application for patent Serial No. 707,068, entitled Electronic Scanning Radar System, filed by Berl D. Levenson and William R. Welty on January 3, 1958, and assigned to the same assignee as is the present case. In the operation of a radar system of the aforementioned type, it is often necessary to change the direction of the synthesized pencil receiving beam in an extremely short interval of time. Because of this, it is highly desirable to use an entirely electronically controlled apparatus, as is the present apparatus, to effect the change in direction of the synthesized pencil beam. A mechanical apparatus, on the other hand, possesses inherent inertia which places limitations on its use. Also, when the apparatus of the present invention is used in conjunction with the above type of electronic scanning radar system, the frequency of the plurality of signals generated by the present apparatus minus a first intermediate frequency of the radar system results in a second intermediate frequency in the system. Hence, it is evident that the frequency of the plurality of signals generated by the instant apparatus must remain substantially unchanged and independent of phase differences therebetween.

In accordance with the present invention, two delay lines having the same dispersion characteristics each have a plurality of corresponding uniformly spaced points therealong where electromagnetic energy may be coupled therefrom. In operation, these two delay lines are fed from opposite extremities with respect to the corresponding spaced points with microwave signals of a variable frequency but which differ in frequency by an amount equal to the desired frequency of the resulting plurality of signals. The signals available from each corresponding pair of spaced points along the delay line are then applied to a respective microwave output mixer to produce a succession of difference-frequency signals which are all of the same frequency. In that the dispersion characteristics of the two delay lines are substantially the same, the phase difference between successive difference-frequency signals is determined and hence controlled by selecting an appropriate frequency for the microwave signals applied to the opposite extremities of the delay lines.

The above-mentioned and other features and objects of this invention and the manner of attaining them will became more apparent by reference to the following description taken in conjunction with the accompanying drawing, wherein the figure illustrates a schematic block diagram of the apparatus of the present invention.

Referring now to the drawing, the apparatus of the present invention comprises delay lines $L_1$ and $L_2$ which are of substantially equal length and have similar dispersion characteristics. Dispersion in a delay or transmission line is the rate of change of the phase of a wave propagated along the line with distance. Coupling junctions 10, 12 are spaced at periodically spaced points along both delay lines $L_1$ and $L_2$, respectively, thereby to divide each of the delay lines into an integral number $m$ electrically equivalent segments whereby each coupling junction 10 along delay line $L_1$ corresponds to a particular coupling junction 12 along delay line $L_2$. In order to clarify the explanation, the delay line $L_1$ is shown disposed adjacent and coextensive with the delay line $L_2$ in the drawing whereby each of the coupling junctions 10 along delay line $L_1$ are disposed substantially opposite their respective corresponding coupling junctions 12 along delay line $L_2$. Thus, the delay lines $L_1$ and $L_2$ are of very similar construction and may, for example, be provided by standard coaxial transmission line. Also, the coupling coefficients between the delay lines $L_1$ and $L_2$ and the coupling junctions 10, 12, respectively, are not critical although it is preferable that the variation in coupling at the different junctions does not exceed approximately 6 decibels.

The delay line $L_1$ is fed at one extremity with a microwave signal generated by a variable frequency S-band generator 14. This generator may be provided by a backward wave oscillator of a conventional type or, alternatively, by a bank of crystal controlled oscillators and multipliers of the type described in application Serial No. 624,155, entitled Two-Pulse MTI Radar System, by Nicholas A. Begovich, and filed November 23, 1956, which application is assigned to the same assignee as is the present case. If the angular frequency of the signal developed by variable frequency S-band generator 14 is designated as $\omega$, the frequency characteristic could be represented by cos $\omega t$. This being the case, if a delay of $\varphi$ radians is introduced between successive coupling junctions 10 of the delay line $L_1$, the frequency characteristic of the microwave signals appearing at successive coupling junctions 10 may be represented as indicated in Table I.

Table I

| Junction: | Frequency Characteristic |
|---|---|
| Input Junction | cos $\omega t$ |
| First Junction | cos ($\omega t-$) |
| Second Junction | cos ($\omega t-2\varphi$) |
| Third Junction | cos ($\omega t-3\varphi$) |
| $n$th Junction | cos ($\omega t-n\varphi$) |
| ($m-2$)nd Junction | cos [$\omega t-(m-2)\varphi$] |
| ($m-1$)st Junction | cos [$\omega t-(m-1)\varphi$] |
| $m$th Junction | cos [$\omega t-m\varphi$] | wherein $m$ is the total number of electrically equivalent segments in each delay line $L_1$ and $L_2$, and $n$ is any integral number from zero to $m$.

In addition to being applied to the one extremity of delay line $L_1$, the signal generated by the variable frequency S-band generator 14 is applied together with the output signal from an oscillator 16, to the input circuits of a mixer 18. The oscillator 16 is preferably crystal controlled and develops an output signal having an angular frequency, $\omega_1$, which frequency determines the frequency of the resulting plurality of output signals in a manner hereinafter described. The actual frequency of oscillator 16

$$f_1 = \frac{\omega_1}{2\pi}$$

is substantially less than the frequency of the signal generated by variable frequency generator 14 and may, for example, be of the order of 42 megacycles per second.

The component appearing at the output of mixer 18 which has an angular frequency equal to the sum of $\omega$ and $\omega_1$ is isolated from the remaining components resulting from the mixing operation by means of a filter 20 and applied to the extremity of delay line $L_2$ which is opposite the extremity which corresponds to the extremity of delay line $L_1$ to which the signal from S-band generator 14 is applied. It is evident from the above explanation that the frequency characteristic of the signal appearing at the output of the filter 20 may be represented by $\cos(\omega+\omega_1)t$ as indicated on the drawing. This signal is applied to the input coupling junction 12 of the delay line $L_2$ which junction 12 corresponds to the $m$th coupling junction 10 of the delay line $L_1$. Although the dispersion characteristics and the periodicities of $L_2$ are substantially the same as for delay line $L_1$, the frequency of the signal applied to delay line $L_2$ is $f_1$ cycles per second higher than the frequency of the signal applied to the delay line $L_1$ whereby the phase shift for each successive periodicity of delay line $L_2$ will be $\varphi_1$ radians greater than it would otherwise be for a signal having a frequency characteristic represented by $\cos \omega t$. Thus, the frequency characteristic of the microwave signal appearing at successive coupling junctions 12 of delay line $L_2$ may be represented as indicated in Table II.

Table II

| Junction: | Frequency characteristic |
| --- | --- |
| Terminating Junction (zero) | $\cos[(\omega+\omega_1)t - m(\varphi+\varphi_1)]$ |
| First Junction | $\cos[(\omega+\omega_1)t - (m-1)(\varphi+\varphi_1)]$ |
| Second Junction | $\cos[(\omega+\omega_1)t - (m-2)(\varphi+\varphi_1)]$ |
| Third Junction | $\cos[(\omega+\omega_1)t - (m-3)(\varphi+\varphi_1)]$ |
| $n$th Junction | $\cos[(\omega+\omega_1)t - (m-n)(\varphi+\varphi_1)]$ |
| $(m-2)$nd Junction | $\cos[(\omega+\omega_1)t - 2(\varphi+\varphi_1)]$ |
| $(m-1)$st Junction | $\cos[(\omega+\omega_1)t - (\varphi+\varphi_1)]$ |
| $m$th Junction (Junction to which signal is applied) | $\cos(\omega+\omega_1)t$ | wherein, as before, $n$ is an integral number which can assume any value from zero to $m$, the number of electrically equivalent segments in each of the delay lines $L_1$ and $L_2$.

It is to be noted that the delay line $L_2$ is fed from the bottom as viewed in the drawing or the $m$th junction as designated above. This nomenclature is used in order that corresponding junctions along both delay lines $L_1$, $L_2$ will have the same designation.

The signals appearing at corresponding pairs of coupling junctions 10, 12 along the delay lines $L_1$, $L_2$, respectively, are next applied to output mixers 22. The output mixers 22 are adapted to mix the two signals applied to their respective input circuits and to filter out all but the component which has a frequency equal to the difference in frequency of the two input signals. As is evident from the frequency characteristics of corresponding signals listed in the aforementioned Tables I and II, the frequency characteristics of the respective output signals which appear on output terminals 24 of mixers 22 are as indicated in the following Table III.

Table III

| Junction: Input-Terminating | Frequency characteristic |
| --- | --- |
| Junction | $\cos[\omega_1 t - m\varphi - m\varphi_1]$ |
| First Junction | $\cos[\omega_1 t - (m-2)\varphi - (m-1)\varphi_1]$ |
| Second Junction | $\cos[\omega_1 t - (m-4)\varphi - (m-2)\varphi_1]$ |
| Third Junction | $\cos[\omega_1 t - (m-6)\varphi - (m-3)\varphi_1]$ |
| $n$th Junction | $\cos[\omega_1 t - (m-2n)\varphi - (m-n)\varphi_1]$ |
| $(m-2)$nd Junction | $\cos[\omega_1 t + (m-4)\varphi - 2\varphi_1]$ |
| $(m-1)$st Junction | $\cos[\omega_1 t + (m-2)\varphi - \varphi_1]$ |
| $m$th Junction | $\cos[\omega_1 t + m\varphi]$ |

As is evident from the signals appearing at the output terminals 24 of the apparatus of the present invention as indicated in Table III above, the signals appearing on successive output terminals 24 differ by a fixed amount equal to $\varphi_1$ radians. When the apparatus of the present invention is used in conjunction with the aforementioned electronic scanning radar system, this fixed difference in phase between successive output signals results in a fixed "error" in the direction of the elevation pencil receiving beam. In that this error remains fixed, it may be compensated for in programming the operation of the radar system.

It is also to be noted that the signals appearing at the output terminals 24 (see Table III) are all of the same angular frequency, $\omega_1$. Further, successive output signals, in addition to the fixed phase difference $\varphi_1$, differ in phase by an amount equal to $2\varphi$ radians. The actual value of $\varphi$ is, of course, determined by the angular S-band frequency, $\omega$, which can be controlled by the variable frequency S-band generator 14.

What is claimed is:

1. An apparatus for producing a plurality of output signals of the same frequency, successive ones of said signals having a determinable phase difference, said apparatus comprising means for generating a first microwave energy signal of a predetermined frequency; first and second delay lines each having first and second extremities, respectively; means for applying said first microwave energy signal of a predetermined frequency to said first extremity of said first delay line; means for generating a second microwave energy signal of a frequency which differs from said predetermined frequency by a fixed number of cycles per second; means for applying said second microwave energy signal to said second extremity of said second delay line; means for coupling energy from said first delay line at $m$ spaced points therealong numbered in ascending sequence towards said second extremity from the point nearest said first extremity wherein $m$ is an integer no less than two; means for coupling energy from $m$ points along said second delay line, said $m$ points being numbered in ascending sequence towards said second extremity from the point nearest said first extremity of said second delay line and being spaced to provide intervals therebetween that are proportional to the electrical distance between corresponding points of said first delay line thereby to provide $m$ pairs of points along said first and second delay lines; and means responsive to the microwave energy appearing at each pair of the $m$ pairs of points along said first and second delay lines for producing $m$ output signals each of a frequency equal to said fixed number of cycles per second and having a determinable phase difference from the remaining output signals.

2. The apparatus as defined in claim 1 wherein said first and second delay lines constitute first and second lengths of coaxial transmission line, respectively.

3. The apparatus as defined in claim 1 wherein said first and second delay lines constitute first and second lengths of waveguide, respectively.

4. The apparatus as defined in claim 1 which includes additional means for varying said predetermined frequency thereby to control said determinable phase difference.

5. The apparatus as defined in claim 1 which additionally includes means for generating oscillations of a frequency equal to said fixed number of cycles per second, and means responsive to said first signal and to said oscillations for producing said second signal.

6. An apparatus for producing a plurality of output signals of the same frequency, sucessive ones of said signals having a determinable phase difference, said apparatus comprising means for generating a first microwave energy signal of a predetermined frequency; first and second delay lines each having first and second extremities, respectively, with similar dispersion characteristics therebetween; means for applying said first microwave energy signal of a predetermined frequency to said first extremity of said first delay line; means for generating a second microwave energy signal of a frequency which differs from said predetermined frequency by a fixed number of cycles per second; means for applying said second microwave energy signal to said second extremity of said second delay line; means for coupling energy from said first delay at $m$ uniformly spaced points therealong numbered in ascending sequence towards said second extremity from the point nearest said first extremity wherein $m$ is an integer no less than two; means for coupling energy from $m$ points along said second delay line, said $m$ points being numbered in ascending sequence towards said second extremity from the point nearest said first extremity of said second delay line and being spaced to provide intervals therebetween that are proportional to the electrical distance between corresponding points of said first delay line thereby to provide $m$ pairs of points along said first and second delay lines, each pair being constituted of points having the same number; and means responsive to said first and second signals appearing at each pair of the $m$ pairs of points along said first and second delay lines for producing $m$ output signals each of a frequency equal to said fixed number of cycles per second and having a determinable phase difference from the remaining output signals.

7. The apparatus as defined in claim 6 wherein $m$ is greater than ten.

References Cited in the file of this patent
UNITED STATES PATENTS

| | | |
|---|---|---|
| 2,449,819 | Purington | Sept. 21, 1948 |
| 2,626,357 | McCellan | Jan. 20, 1953 |